(12) United States Patent
Bilobrov

(10) Patent No.: US 8,396,705 B2
(45) Date of Patent: *Mar. 12, 2013

(54) EXTRACTION AND MATCHING OF CHARACTERISTIC FINGERPRINTS FROM AUDIO SIGNALS

(75) Inventor: Sergiy Bilobrov, Coquitlam (CA)

(73) Assignee: Yahoo! Inc., Sunnyvale, CA (US)

(*) Notice: Subject to any disclaimer, the term of this patent is extended or adjusted under 35 U.S.C. 154(b) by 1007 days.

This patent is subject to a terminal disclaimer.

(21) Appl. No.: 12/392,062

(22) Filed: Feb. 24, 2009

(65) Prior Publication Data

US 2009/0157391 A1 Jun. 18, 2009

Related U.S. Application Data

(63) Continuation of application No. 11/219,385, filed on Sep. 1, 2005, now Pat. No. 7,516,074.

(51) Int. Cl.
*G10L 21/00* (2006.01)
(52) U.S. Cl. ........................................ 704/217; 704/270
(58) Field of Classification Search .................. 704/217, 704/270
See application file for complete search history.

(56) References Cited

U.S. PATENT DOCUMENTS

| 7,174,293 | B2 | 2/2007 | Kenyon et al. |
| 7,194,752 | B1 | 3/2007 | Kenyon et al. |
| 7,783,489 | B2 | 8/2010 | Kenyon et al. |
| 7,870,574 | B2 | 1/2011 | Kenyon et al. |

FOREIGN PATENT DOCUMENTS

| JP | 5-073093 A | 3/1993 |
| JP | 2000-285104 A | 10/2000 |
| JP | 2005-266013 A | 9/2005 |
| JP | 2006-505821 A | 2/2006 |
| WO | 02/11123 A2 | 2/2002 |
| WO | 2004/044820 A1 | 5/2004 |

OTHER PUBLICATIONS

Final Office Action for U.S. Appl. No. 12/956,493, mailed Jul. 29, 2011.
Notice of Grounds for Rejection issued on Nov. 29, 2011 in Japanese Patent Appln. No. 2006-230500.
Sukittanon et al., "Modulation-Scale Analysis for Content Identification", IEEE Transactions on Signal Processing, vol. 52, No. 10, Oct. 2004, pp. 3023-3035.
Cano et al., "A Review of Algorithms for Audio Fingerprinting", Multimedia Signal Processing, 2002 IEEE Workshop on, IEEE, Sep. 2002, pp. 169-173.

*Primary Examiner* — Susan McFadden
(74) *Attorney, Agent, or Firm* — James J. DeCarlo; Greenberg Traurig, LLP

(57) ABSTRACT

A method, database, and article of manufacture comprising a plurality of audio fingerprints. Each audio fingerprint contains characteristic information about a corresponding audio frame and is produced by filtering the corresponding audio frame into frequency bands, resampling the filtered audio signals at a nonlinear timescale, transforming the resampled audio signals for each frequency band to produce a feature vector for the frequency band, and computing the audio fingerprint based on the set of feature vectors, and one or more index values for one or more of the audio fingerprints, where the audio fingerprints are organized according to their index values.

38 Claims, 4 Drawing Sheets

Audio Fragment

EXTRACTION AND MATCHING OF CHARACTERISTIC FINGERPRINTS FROM AUDIO SIGNALS

CROSS REFERENCE TO RELATED APPLICATIONS

This application is a continuation of U.S. application Ser. No. 11/219,385, filed Sep. 1, 2005, now U.S. Pat. No. 7,516,074, which is incorporated by reference in its entirety.

BACKGROUND

The present invention relates generally to audio signal processing, and more particularly to extracting characteristic fingerprints from audio signals and to searching a database of such fingerprints.

Because of the variations in file formats, compression technologies, and other methods of representing data, the problem of identifying a data signal or comparing it to others raises significant technical difficulties. For example, in the case of digital music files on a computer, there are many formats for encoding and compressing the songs. In addition, the songs are often sampled into digital form at different data rates and have different characteristics (e.g., different waveforms). Recorded analog audio also contains noise and distortions. These significant waveform differences make direct comparison of such files a poor choice for efficient file or signal recognition or comparison. Direct file comparison also does not allow comparison of media encoded in different formats (e.g., comparing the same song encoded in MP3 and WAV).

For these reasons, identifying and tracking media and other content, such as that distributed over the Internet, is often done by attaching metadata, watermarks, or some other code that contains identification information for the media. But this attached information is often incomplete, incorrect, or both. For example, metadata is rarely complete, and filenames are even more rarely uniform. In addition, approaches such as watermarking are invasive, altering the original file with the added data or code. Another drawback of these approaches is that they are vulnerable to tampering. Even if every media file were to include accurate identification data such as metadata or a watermark, the files could be "unlocked" (and thus pirated) if the information were successfully removed.

To avoid these problems, other methods have been developed based on the concept of analyzing the content of a data signal itself. In one class of methods, an audio fingerprint is generated for a segment of audio, where the fingerprint contains characteristic information about the audio that can be used to identify the original audio. In one example, an audio fingerprint comprises a digital sequence that identifies a fragment of audio. The process of generating an audio fingerprint is often based on acoustical and perceptual properties of the audio for which the fingerprint is being generated. Audio fingerprints typically have a much smaller size than the original audio content and thus may be used as a convenient tool to identify, compare, and search for audio content. Audio fingerprinting can be used in a wide variety of applications, including broadcast monitoring, audio content organization, filtering of content of P2P networks, and identification of songs or other audio content. As applied to these various areas, audio fingerprinting typically involves fingerprint extraction as well as fingerprint database searching algorithms.

Most existing fingerprinting techniques are based on extracting audio features from an audio sample in the frequency domain. The audio is first segmented into frames, and for every frame a set of features is computed. Among the audio features that can be used are Fast Fourier Transform (FFT) coefficients, Mel Frequency Cepstral Coefficients (MFCC), spectral flatness, sharpness, Linear Predictive Coding (LPC) coefficients, and modulation frequency. The computed features are assembled into a feature vector, which is usually transformed using derivatives, means, or variances. The feature vector is mapped into a more compact representation using algorithms such as Hidden Markov Model or Principal Component Analysis, followed by quantization, to produce the audio fingerprint. Usually, a fingerprint obtained by processing a single audio frame has a relatively small size and may not be sufficiently unique to identify the original audio sequence with the desired degree of reliability. To enhance fingerprint uniqueness and thus increase the probability of correct recognition (and decrease false positive rate), small sub fingerprints can be combined into larger blocks representing about three to five seconds of audio.

One fingerprinting technique, developed by Philips, uses a short-time Fourier Transform (STFT) to extract a 32-bit sub-fingerprint for every interval of 11.8 milliseconds of an audio signal. The audio signal is first segmented into overlapping frames 0.37 seconds long, and the frames are weighed by a Hamming window with an overlap factor of 31/32 and transformed into the frequency domain using a FFT. The frequency domain data obtained may be presented as a spectrogram (e.g., a time-frequency diagram), with time on the horizontal axis and frequency on the vertical axis. The spectrum of every frame (spectrogram column) is segmented into 33 non-overlapping frequency bands in the range of 300 Hz to 2000 Hz, with logarithmic spacing. The spectral energy in every band is calculated, and a 32-bit sub-fingerprint is generated using the sign of the energy difference in consecutive bands along the time and frequency axes. If the energy difference between two bands in one frame is larger that energy difference between the same bands in the previous frame, the algorithm outputs "1" for the corresponding bit in the sub-fingerprint; otherwise, it outputs "0" for the corresponding bit. A fingerprint is assembled by combining 256 subsequent 32-bit sub-fingerprints into single fingerprint block, which corresponds to three seconds of audio.

Although designed to be robust against common types of audio processing, noise, and distortions, this algorithm is not very robust against large speed changes because of the resulting spectrum scaling. Accordingly, a modified algorithm was proposed in which audio fingerprints are extracted in the scale-invariant Fourier-Mellin domain. The modified algorithm includes additional steps performed after transforming the audio frames into the frequency domain. These additional steps include spectrum log-mapping followed by a second Fourier transform. For every frame, therefore, a first FFT is applied, the result is log-mapped obtained a power spectrum, and a second FFT is applied. This can be described as the Fourier transform of the logarithmically resampled Fourier transform, and it is similar to well known MFCC methods widely used in speech recognition. The main difference is that Fourier-Mellin transform uses log-mapping of whole spectrum, while MFCC is based on the mel-frequency scale (linear up to 1 kHz and has log spacing for higher frequencies, mimicking the properties of the human auditory system).

The Philips algorithm falls into a category of so-called short-term analysis algorithms because the sub-fingerprints are calculated using spectral coefficients of just two consecutive frames. There are other algorithms that extract spectral features using multiple overlapped FFT frames in the spectrogram. Some of the methods based on evaluation of multiple frames in time are known as long-term spectrogram analysis algorithms.

One long-term analysis algorithm, described for example in Sukittanon, "Modulation-Scale Analysis for Content Identification," IEEE Transactions on Signal Processing, vol. 52, no. (October 2004), is based on the estimation of modulation frequencies. In this algorithm, the audio is segmented and a spectrogram is computed for it. A modulation spectrum is then calculated for each spectrogram band (e.g., a range of frequencies in the spectrogram) by applying a second transform along the temporal row (e.g., the horizontal axis) of the spectrogram. This is different from the modified Philips approach, in which the second FFT is applied along the frequency column of the spectrogram (e.g., the vertical axis). In this approach, the spectrogram is segmented into N frequency bands, and the same number N of continuous wavelet transforms (CWT) are calculated, one for each band.

Although the developers of this algorithm claim superior performance compared to the Philips algorithm, existing algorithms still exhibit a number of deficiencies. For example, the algorithms may not be sufficiently robust to identify distorted speech and music reliably, especially when the audio is compressed using a CELP audio codec (e.g., associated with cell phone audio, such as GSM). Moreover, these algorithms are generally sensitive to noise and analog distortions, such as those associated with a microphone recording. And even if the algorithms can identify audio in presence of single type of distortion, they may not be able to handle a combination of multiple distortions, which is more common and closer to a real world scenario (e.g., as with a cell phone, audio recorded from a microphone in a noisy room with light reverberation followed by GSM compression).

When applied to practical applications, therefore, existing fingerprinting schemes have unacceptably high error rates (e.g., false positives and false negatives), produce fingerprints that are too large to be commercially viable, and/or are too slow. Accordingly, there exists a need to overcome existing limitations that current audio recognition techniques have failed to solve.

SUMMARY OF THE INVENTION

Accordingly, the present invention enables a characteristic fingerprint to be extracted from an audio signal based on the content of that signal. This fingerprint can be matched against a set of reference fingerprints (e.g., in a database) to determine the identity of the signal or the similarity between two signals. Because of the nature of the fingerprint extraction algorithm, it does not suffer from many of the problems that plague existing solutions, and as compared to such solutions it is fast, efficient, highly accurate, scalable, and robust.

In an embodiment of a method for generating an audio fingerprint, an audio signal is sampled and spectrogram information is computed from the signal. The spectrogram is divided into a plurality of frequency bands. The sequences samples in each of the bands are logarithmically re-sampled, causing a log-mapping of the band samples. A second FFT is then applied to the log-mapped band samples to obtain a feature vector for each band. The audio fingerprint is then computed based on the feature vectors. The audio fingerprint may be stored on a computer readable medium or may be fixed momentarily as a transmissible signal.

Unlike previous audio fingerprinting schemes, embodiments of the invention extract a long-term feature vector from a series of frequency band samples non-linearly (e.g., logarithmically) spaced in time. Although previous methods have used log mapping along the frequency axis of the spectrogram (e.g., the Fourier-Mellin transform and the bark scale), they have used a linear time scale. In contrast, in embodiments of the invention, the use of a nonlinear (e.g., logarithmic) time scale for processing the sub-band samples can significantly improve the robustness of the fingerprint extraction and matching algorithms.

For example, time log-mapping of the sub-band samples makes the algorithm less sensitive to variations in audio playback speed and time compression and stretching. This is because the logarithmic resampling causes any scaling in the playback speed to be a linear shift in the log-mapped spectrogram, and the linear shift is removed by the FFT. In this way, the fingerprint of an audio signal should have little or no variation regardless of variations in its playback speed or due to time compression or stretching. The usage of the logarithmic time scale also improves the low frequency resolution of the second time-frequency FFT transform. This allows the use of a simple FFT instead of complex wavelet transforms used for analysis of the spectrogram modulation spectrum, making the implementation more efficient and faster compared to previous methods.

Moreover, because of the nonlinear (e.g., logarithmic) rescaling in time, the band output frame contains, for the most part, samples that represent the beginning of the analyzed audio sequence. The resulting fingerprint is thus generated using samples primarily located at the beginning of the sequence. Since a relatively small part of the audio sequence make the most contribution in the resulting fingerprint, the fingerprint may be used to match shorter audio sequences. In one implementation, for example, a fingerprint generated from a five-second original audio frame can be reliably matched to samples taken from audio fragments that are twice as short.

Embodiments of the fingerprinting techniques are also tolerant to noise and signal distortions. One implementation can detect speech-like signals in the presence of 100% of white noise (i.e., a signal to noise ration of 0 db). The techniques are also tolerant to filtering, compression, frequency equalization, and phase distortions. For example, an embodiment of the invention is able to recognize reliably audio that has a ±5% variation in pitch (under conditions of preserved tempo) and a ±20% variation in timing (under conditions of preserved pitch).

In another embodiment, where the generated fingerprint frame is formed using a specified number of frequency bands, an acoustic model is used to mark insignificant frequency bands. Insignificant bands may include bands that do not add substantially any perceptible value in distinguishing the audio sample. Processing only relevant frequency bands increases the signal to noise ratio and improves robustness of the overall fingerprint matching process. Moreover, excluding irrelevant frequency bands can greatly improve the recognition efficiency of band-limited audio content, for example in case of speech encoded at very low bit rate or analog recordings with slow tape speed.

Embodiments of the invention also provide for fast indexing and efficient searching for fingerprints in a large-scale database. For example, an index for each audio fingerprint may be computed from a portion of the fingerprint's contents. In one embodiment, a set of bits from a fingerprint is used as the fingerprint's index, where the bits correspond to the more stable low frequency coefficients due to the non-linear (e.g., logarithmic) resampling. To match a test fingerprint with a set of fingerprints in a database, the test fingerprint may be matched against the indexes to obtain a group of candidate fingerprints. The test fingerprint is then matched against the candidate fingerprints, thereby avoiding the need to match the test fingerprint against every fingerprint in the database.

In another embodiment, an edge detection algorithm is used to determine the exact edges of an analyzed audio frame or fragment. In some applications, especially when audio samples differ only during short time periods of the overall samples, knowing the location of the edge of the analyzed audio frame within the audio sample is important. The edge detection algorithm may use linear regression techniques to identify the edge of an audio frame.

Applications of embodiments of the fingerprinting technology are numerous, and they include the real-time identification of audio streams and other audio content (e.g., streaming media, radio, advertisements, Internet broadcasts, songs in CDs, MP3 files, or any other type of audio content). Embodiments of the invention thus enable efficient, real-time media content auditing and other reporting.

DETAILED DESCRIPTION OF THE PREFERRED EMBODIMENTS

Overview

Figure 1:
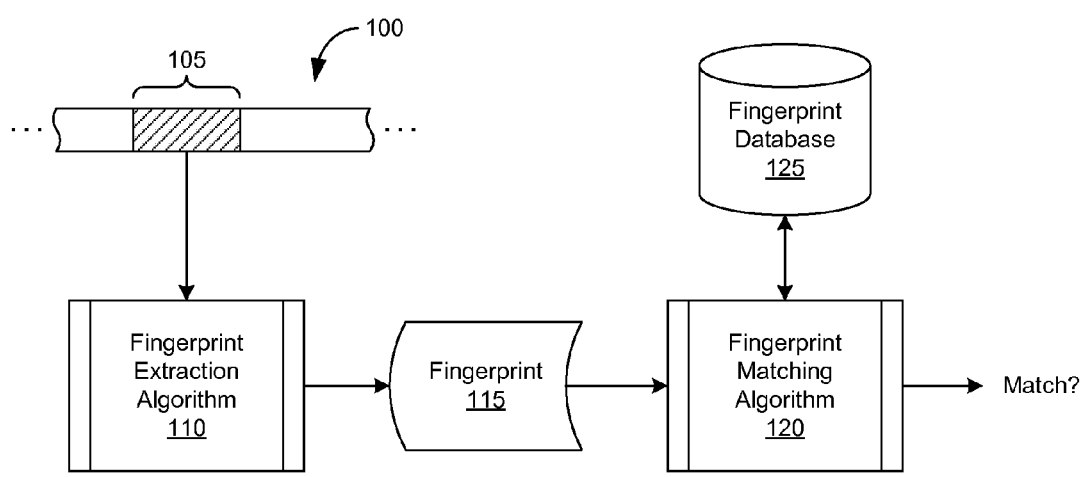
FIG. 1 is a schematic drawing of a process for extracting and using a fingerprint from an audio sample, in accordance with an embodiment of the invention.

Embodiments of the invention enable the extraction of characteristic information (e.g., an audio fingerprint) from a sample of audio as well as the matching or identification of the audio using that extracted characteristic information. As illustrated in FIG. 1, a frame 105 of audio taken from an audio sample 100 is input into a fingerprint extraction algorithm 110. The audio sample 100 may be provided by any of a wide variety of sources. Using the sequence of audio frames 105, the fingerprint extraction algorithm 110 generates one or more audio fingerprints 115 that are characteristic of the sequence. Serving as a distinguishing identifier, the audio fingerprint 115 provides information relating to the identity or other characteristics of the sequence of frames 105 of the audio sample 100. In particular, one or more fingerprints 115 for the audio sample 100 may allow the audio sample 100 to be uniquely identified. Embodiments of the fingerprint extraction algorithm 110 are described in more detail below.

Once generated, the extracted fingerprint 115 can then be used in a further process or stored on a medium for later use. For example, the fingerprint 115 can be used by a fingerprint matching algorithm 120, which compares the fingerprint 115 with entries in a fingerprint database 125 (e.g., a collection of audio fingerprints from known sources) to determine the identity of the audio sample 100. Various methods for using the fingerprints are also described below.

The audio sample 100 may originate from any of a wide variety of sources, depending on the application of the fingerprinting system. In one embodiment, the audio sample 100 is sampled from a broadcast received from a media broadcaster and digitized. Alternatively, a media broadcaster may transmit the audio in digital form, obviating the need to digitize it. Types of media broadcasters include, but are not limited to, radio transmitters, satellite transmitters, and cable operators. The fingerprinting system can thus be used to audit these broadcasters to determine what audio are broadcast at what times. This enables an automated system for ensuring compliance with broadcasting restrictions, licensing agreements, and the like. Because the fingerprint extraction algorithm 110 may operate without having to know the precise beginning and ending of the broadcast signals, it can operate without the cooperation or knowledge of the media broadcaster to ensure independent and unbiased results.

In another embodiment, a media server retrieves audio files from a media library and transmits a digital broadcast over a network (e.g., the Internet) for use by the fingerprint extraction algorithm 110. A streaming Internet radio broadcast is one example of this type of architecture, where media, advertisements, and other content is delivered to an individual or to a group of users. In such an embodiment, the fingerprint extraction algorithm 110 and the matching algorithm 120 usually do not have any information regarding the beginning or ending times of individual media items contained within the streaming content of the audio sample 100; however, these algorithms 110 and 120 do not need this information to identify the streaming content.

In another embodiment, the fingerprint extraction algorithm 110 receives the audio sample 100, or a series of frames 105 thereof, from a client computer that has access to a storage device containing audio files. The client computer retrieves an individual audio file from the storage and sends the file to the fingerprint extraction algorithm 110 for generating one or more fingerprints 115 from the file. Alternatively, the client computer may retrieve a batch of files from storage 140 and sends them sequentially to the fingerprint extractor 110 for generating a set of fingerprints for each file. (As used herein, "set" is understood to include any number of items in a grouping, including a single item.) The fingerprint extraction algorithm 110 may be performed by the client computer or by a remote server coupled to the client computer over a network.

Algorithm

Figure 2:
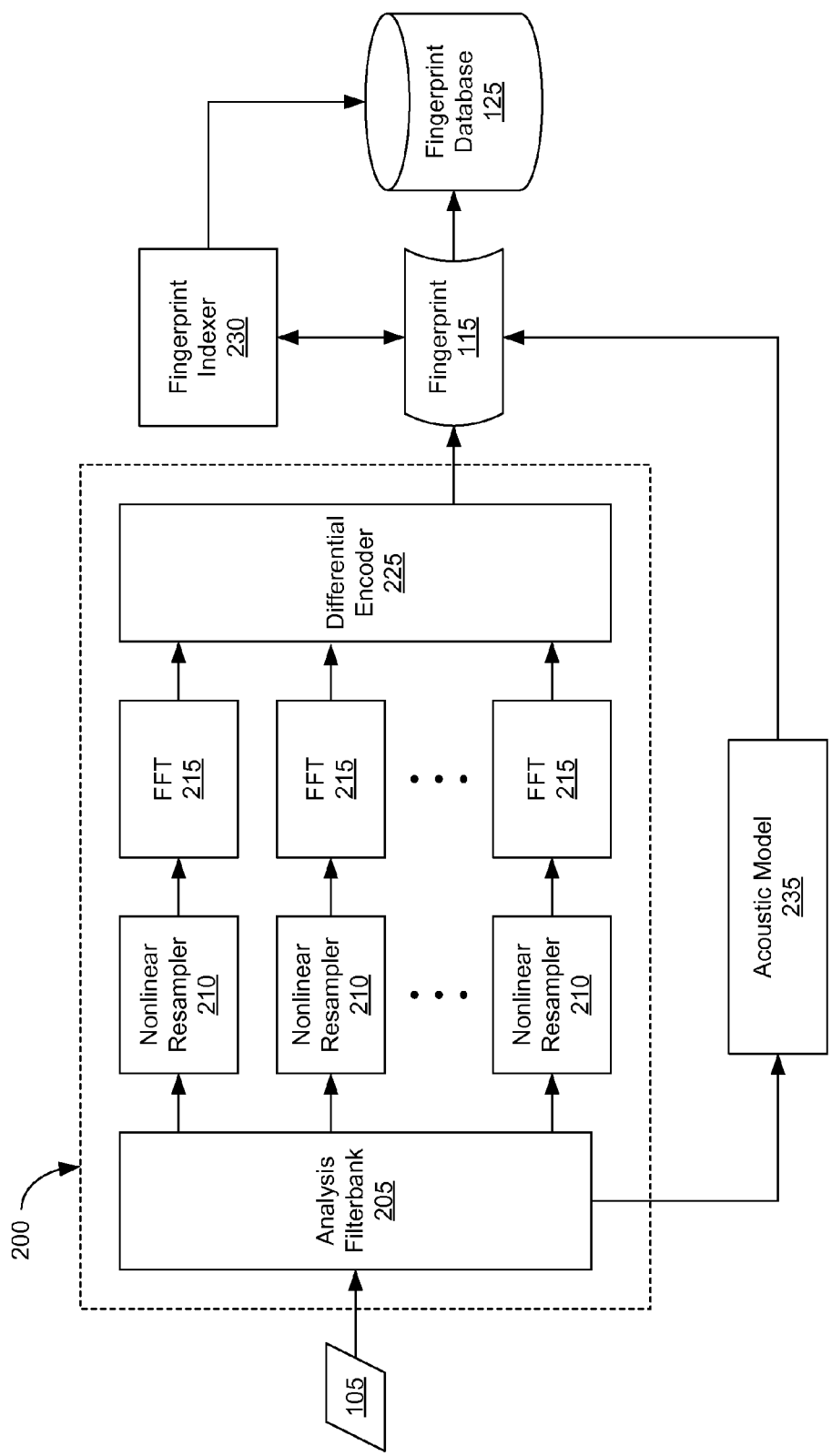
FIG. 2 is a schematic diagram of a fingerprint extraction system, in accordance with an embodiment of the invention.

One embodiment of a fingerprint extraction system 200 that implements the fingerprint extraction algorithm 110 shown in FIG. 1 is illustrated in FIG. 2. The fingerprint extraction system 200 comprises an analysis filterbank 205, which is coupled to a plurality of processing channels (each including one or more processing modules, labeled here as elements 210 and 215), which are in turn coupled to a differential encoder 225 for producing an audio fingerprint 115. The fingerprint extraction system 200 is configured to receive an audio frame 105, for which an audio fingerprint is to be generated.

Described in more detail below, for every input audio frame 105 the analysis filterbank 205 generally computes power spectrum information for a received signal across a range of frequencies. In the embodiment shown, each processing channel corresponds to a frequency band within that range of frequencies, which bands may overlap. Accordingly, the channels divide the processing performed by the fingerprint extraction system 200 so that each channel performs the processing for a corresponding band. In other embodiments, the processing for the plurality of bands may be performed in a single channel by a single module, or the processing may be divided in any other configuration as appropriate for the application and technical limitations of the system.

The analysis filterbank 205 receives an audio frame 105 (such as the frame 105 from the audio sample 100 illustrated in FIG. 1). The analysis filterbank 205 converts the audio frame 105 from the time domain into the frequency domain to compute power spectrum information for the frame 105 over a range of frequencies. In one embodiment, the power spectrum for the signal in a range of about 250 to 2250 Hz is split into a number of frequency bands (e.g., M bands, where M=13). The bands may have a linear or a logarithmic mid-frequency distribution (or any other scale) and also may overlap. The output of the filterbank contains a measure of the energy of the signal for each of a plurality of bands. In one embodiment, the measure of the average energy is taken using the cubic root of the average spectral energy in the band.

Various implementations of the analysis filterbank 205 are possible, depending on the software and hardware requirements and limitations of the system. In one embodiment, the analysis filterbank 205 comprises a number of band-pass filters that isolate the signal of the audio frame 105 for each of the frequency bands followed by energy estimation and down sampling. In another embodiment, the analysis filterbank 205 is implemented using a short-time Fast Fourier Transform (FFT). For example, the audio 100 sampled at 8 kHz is segmented into 64-ms frames 105 (i.e., 512 samples). The power spectrum of each 50% overlapped segment consisting of two audio frames 105 (i.e. 1024 samples) is then calculated by Han windowing and performing an FFT, followed by band filtering using M evenly or logarithmically spaced overlapped triangle windows.

In one embodiment, the power spectrum is averaged within frequency bands and only changes of energy in frame sequence are taken for calculation of the feature vectors for some embodiments (described below). Due to the usage of the energy change instead of the absolute magnitude and to the low requirements to spectral characteristics of the filterbank 205, a variety of time-frequency domain transforms may be used instead of the FFT described above. For example, a Modified Discrete Cosine Transform (MDCT) may be used. One advantage of the MDCT is its low complexity, as is may be computed using only one n/4 point FFT and some pre- and post-rotation of the samples. Accordingly, a filterbank 205 implemented with MDCT is expected to perform better than one implemented with a FFT, e.g., able to calculate transforms twice as fast.

In another embodiment, the analysis filterbank 205 is implemented using the MP3 hybrid filterbank, which includes a cascading polyphase filter and a MDCT followed by aliasing cancellation. The MP3 filterbank produces 576 spectral coefficients for every frame 105 of audio consisting of 576 samples. For audio sampled at 8 kHz, the resulting frame rate is 13.8 fps compared to 15.626 fps of a 1024-point FFT filterbank described above. The frame rate difference is set off during the time-frequency analysis when the data are resampled, as discussed below. The analysis filterbank 205 may also be implemented using a Quadrature Mirror Filter (QMF). The first stage of MP3 hybrid filterbank employs a QMF filter with 32 equal-width bands. Accordingly, the 250 to 2250-Hz frequency range of an 11,025-Hz audio signal may thus be divided into 13 bands.

One advantage of the MP3 filterbank is its portability. There are highly optimized implementations of MP3 filterbanks for different CPUs. Accordingly, the fingerprint generation routine can be easily integrated with the MP3 encoder, which may obtain spectral coefficients from the MP3 filterbank without additional processing. Accordingly, the fingerprint generation routine can be easily integrated with the MP3 decoder, which may obtain spectral data directly from a MP3 bit stream without its complete decoding. Integration with other audio codecs is also possible.

Once it is determined, the sub-band samples are buffered and provided to one or more nonlinear resamplers 210. In one embodiment, each nonlinear resampler 210 corresponds to one of the M frequency bands. Each nonlinear resampler 210 thus receives a sequence of S samples for a particular frequency band linearly spaced in time (e.g., where S is selected to be from 64 to 80, depending on the filterbank's implementation). In one embodiment, each resampler 210 logarithmically maps the sub-band samples in one of the M bands, producing a series of T samples (e.g., where T=64) that are logarithmically spaced in time. When this is performed for each of the M bands, the data can be stored in a [M×T] matrix, which corresponds to a sampled spectrogram having a time (horizontal) axis with logarithmic scale. Logarithmic sampling is just one possibility, however, and in other embodiments other types of nonlinear sampling may be performed, such as exponential resampling.

The sub-band samples are then provided to one or more FFT modules 215, which perform a transform on the nonlinearly mapped samples for each band. In one embodiment, a T-point FFT is performed on the log-mapped band samples for each band (e.g., each row of the [M×T] matrix). The resulting series of coefficients from the FFT is called a feature vector. In one embodiment, the feature vector for each band comprises every other coefficient of the FFT computed for that band in order of ascending frequency. Accordingly, each feature vector would include N coefficients (e.g., where N=T/2=32).

Although the FFT modules 215 are described as performing a FFT on the sub-band samples, in other embodiments the FFT modules 215 are replaced by processing modules that perform other time-frequency transforms. For example, instead of the FFT, the Discrete Cosine Transform (DCT) or the Discrete Hartley Transform (DHT) may be used to transform the sub-band samples. In particular, using the DHT tends to produce a low false positive rate and de-correlated index values, which helps to make the search algorithm faster. In another embodiment, linear prediction coding is used as the second transform in place of the FFT modules 215.

The feature vectors are then provided to a differential encoder 225, which generates a fingerprint 115 for the audio sample. In one embodiment, the differential encoder 225 subtracts the feature vectors corresponding to each pair of adjacent bands. If there are M bands, there are M−1 pairs of adjacent bands. Subtracting two feature vectors gives a vector of N difference values. For each of these difference values, the differential encoder 225 selects a 1 if the difference is greater than or equal to 0, and the differential encoder 225 selects a 0 is the difference is less than 0. For each group of four bits in the sequence, the encoder assigns a bit value according to a codebook table. The best codebook values are calculated during tuning and training of the fingerprinting algorithm. Repeating this process for the feature vectors of each of the consecutive pairs of bands results in a [(M−1)×N/4] matrix of bits. This matrix, which can be represented as a linear bit sequence, is used as the audio fingerprint 115. In the example where M=13 and N=8, the fingerprint 115 has 12 bytes of information.

In one embodiment, the Principal Component Analysis (PCA) is used to de-correlate and reduce size of the obtained feature vector before it is quantized. Other de-correlation techniques, such the Digital Cosine Transform, may be used in addition or alternatively to eliminate redundancy and compact the feature vector.

In one embodiment, the fingerprint extraction system 200 generates a plurality of fingerprints for a highly overlapped series of audio frames in a particular audio signal. In one example, each series of frames 105 processed by the system 200 contains three seconds of the audio signal and starts 64 milliseconds after a previous series starts. In this way, a fingerprint is generated for a number of three-second portions of the audio signal that begin every 64 milliseconds. To implement such a scheme, the fingerprint extraction system 200 may include memory buffers before and after the analysis filterbank 205, where the buffers are updated with the next 64 milliseconds of the audio signal as the next audio frame 105 is received.

Acoustic Model

In various applications of the fingerprinting system, certain frequency bands may be insignificant because they are imperceptible, because an encoding process for the audio sample removed the bands, or for some other reason. In one embodiment, therefore, an acoustic model 235 is used to identify and mark the insignificant frequency bands for a particular fingerprint. Acoustic models, such as the psychoacoustic model, are well known in various audio processing fields. A set of model parameters for the acoustic model 235 can be calculated for high quality reference samples during the creation of a fingerprint 115 and stored in the database 125. The insignificant bands in the fingerprint 115 can be marked by zeroing out their corresponding values (i.e., bits). This effectively causes the bands to be ignored in any subsequent matching process, since in the process of matching of a fingerprint with the database records, only pairs of correspondent bands that have non-zero values are used to distinguish the fingerprint 115. Masked bands (i.e., those having zero values) may also be excluded from comparison altogether.

In one embodiment, the acoustic model is a psychoacoustic model for the human auditory system. This may be useful where the purpose of the fingerprinting system is the identification of audio targeted human auditory system. Such audio may be compressed by one or more perceptual encoders removing irrelevant audio information. The use of the human psycho acoustic model allows identifying and excluding such irrelevant bands from the fingerprints.

But the psychoacoustic model is just one type of an acoustic model that is suited to human perceptual encoded audio. Another acoustic model is a model that mimics the properties of a specific recording device. Each band for such a recording device acoustic model may have a weight factor assigned to it depending on its importance. Yet another acoustic model mimics the properties of specific environments, such as background noise found in a vehicle or room. In such an embodiment, each band for the acoustic model may have a weight factor assigned to it depending on its importance in the environment for which the system is designed.

In one embodiment, parameters of the acoustic model 235 and filterbank 205 depend on the type and properties of the analyzed audio signal 100. Different profiles comprising a set of subband weight factors and a number of filterbank bands and their frequency distributions are used to obtain a better match of the properties of the targeted audio signal. For speech-like audio, for example, the power of the signal is mainly concentrated in low frequency bands, while music might contain higher frequency relevant components depending on genre. In one embodiment, the parameters of the acoustic model are calculated from the reference audio signal and stored in content database together with generated fingerprints. In another embodiment, the parameters of the acoustic model are calculated dynamically based on properties of analyzed audio signal during the matching process.

Accordingly, possible applications of the acoustic model 235 include tuning the audio recognition parameters for specific environment and/or recording device and encoding algorithm properties. For example, knowing acoustical properties of the cell phone audio path (microphone characteristics, audio processing and compression algorithms, and the like) allows the development of an acoustic model that mimics these properties. Using this model during fingerprint comparison may significantly increase robustness of the matching process of the generated fingerprints.

Fingerprint Indexing and Matching

In one embodiment, a fingerprint indexer 230 generates an index for each fingerprint 115. The fingerprints 115 are then stored in the fingerprint database 125, allowing for efficient searching and matching of the contents of the fingerprint database 125. In an embodiment, the index for a fingerprint 115 comprises a portion of the fingerprint 115. Accordingly, the fingerprints 115 in the fingerprint database 125 are indexed according to useful identifying information about them.

In an embodiment described above in which each fingerprint 115 comprises a [(M−1)×N/4] matrix of bits, the indexer 230 uses the bits from the leftmost columns as the index. In the example where each fingerprint 115 is a 12 by 8 matrix of bits, the index for the fingerprint 115 may be the leftmost two columns of bits (24 bits total). In this way, the bits used as the index for each fingerprint 115 are a subset of the fingerprint 115 that are based on the low frequency spectral coefficients of the feature vectors used to computer the fingerprint 115. These bits thus correspond to the low frequency components of the spectrum of the log-mapped spectrogram bands, which are stable and insensitive to moderate noise and distortions. With a high level of probability, therefore, similar fingerprints would have the same numerical value of the index. In this way, the index may be used to label and group similar and likely matching fingerprints in database.

Figure 3:
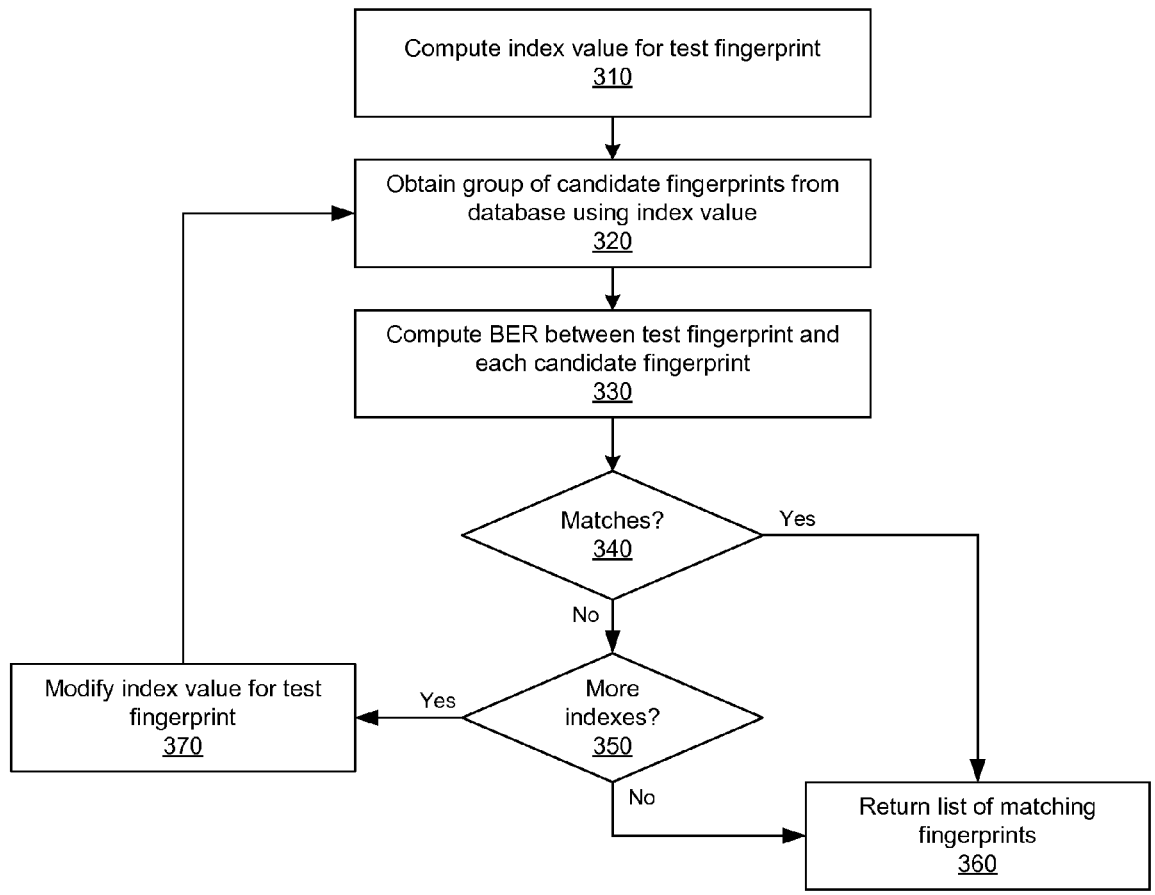
FIG. 3 is a flow diagram of a matching algorithm, in accordance with an embodiment of the invention.

FIG. 3 illustrates a method of matching a test fingerprint to the fingerprint database 125 using the indexes described above, in accordance with one embodiment of the invention. To find a match in the fingerprint database 125 for a test fingerprint, the matching algorithm begins by computing 310 an index value for the test fingerprint as described above. Using this index value, a group of candidate fingerprints is obtained 320, for example, where the group includes all of the fingerprints in the database 125 that have the same index value. As explained above, it is highly likely that any matches in the database 125 are in this group of candidate fingerprints because of the way the index value is computed.

To test for any matches in the group of candidate fingerprints, a bit error rate (BER) between the test fingerprint and each candidate fingerprint is computed 330. The BER between two fingerprints is the percentage of their corresponding bits that do not match. For unrelated completely random fingerprints, the BER would be expected to be 50%. In one embodiment, two fingerprints are matching where the BER is less than about 35%; however, other numerical limits may be used depending on the desired tolerance for false positives and/or false negatives. In addition, calculations or criteria other than BER can be used to compare two fingerprints. For example, the inverse measure of BER, the match rate may be also used. Moreover, certain bits may be weighted more highly than others in the comparison of two fingerprints.

If 340 there are no matches within the predetermined matching criteria, or if 350 there are no more indexes to modify, the matching algorithm has failed to find any matches of the test fingerprint in the database 125. The system may then continue to search (e.g., using less restrictive criteria in obtaining the candidate fingerprints) or may stop. If 340 there are one or more matching fingerprints, a list of the matching fingerprints is returned 360.

In one embodiment, the system may repeat the search as described above after modifying 370 the calculated fingerprint index in order to obtain a different set of candidate fingerprints from which to search for a match. To modify 370 the calculated fingerprint index, one or multiple bits of the calculated fingerprint index may be flipped. In one example where the fingerprint index has 24 bits, after failing to find a match using the original fingerprint index, the search step is repeated 24 times with a different single bit of the 24-bit fingerprint index flipped each time. Various other techniques can be used to enlarge the search space.

In one embodiment, the fingerprint indexer 230 generates one or more indexes by selecting index bits from one or more fingerprints based on a set of frequency band weight factors calculated by the acoustic model 235 and previously stored in the database 125. When multiple indexes are used, including indices obtained by bit flipping, the group of candidate fingerprints includes all candidates obtained for every calculated index.

In another embodiment, the area of search may be narrowed by prescreening and selecting only fingerprint candidates found in most or all candidate groups obtained for each calculated index. Prescreening of the multiple fingerprint candidates groups by using multiple indices, including indices obtained by bit flipping, may significantly improve the performance of the database search. In one embodiment, indexes and references to possible fingerprint candidates are stored in computer memory allowing fast selection and prescreening of the fingerprint candidates. On the second step (step 320), only fingerprint candidates that have the highest probability to match given fingerprint are loaded into computer memory and compared. This approach allows fast search by keeping only small indices in computer memory, while storing larger fingerprints on slow devices (e.g., a hard drive or over a network).

Detecting Edges of an Audio Frame

In some applications, it may be desirable to detect the edges of a matching audio fragment. Edge detection allows the system to know precisely where a particular matching audio fragment occurs in time. Depending on the quality of the analyzed audio, embodiments of the edge detection algorithm may be able to detect the edges of a matching audio fragment with about 0.1 to 0.5 seconds of precision.

Figure 4:
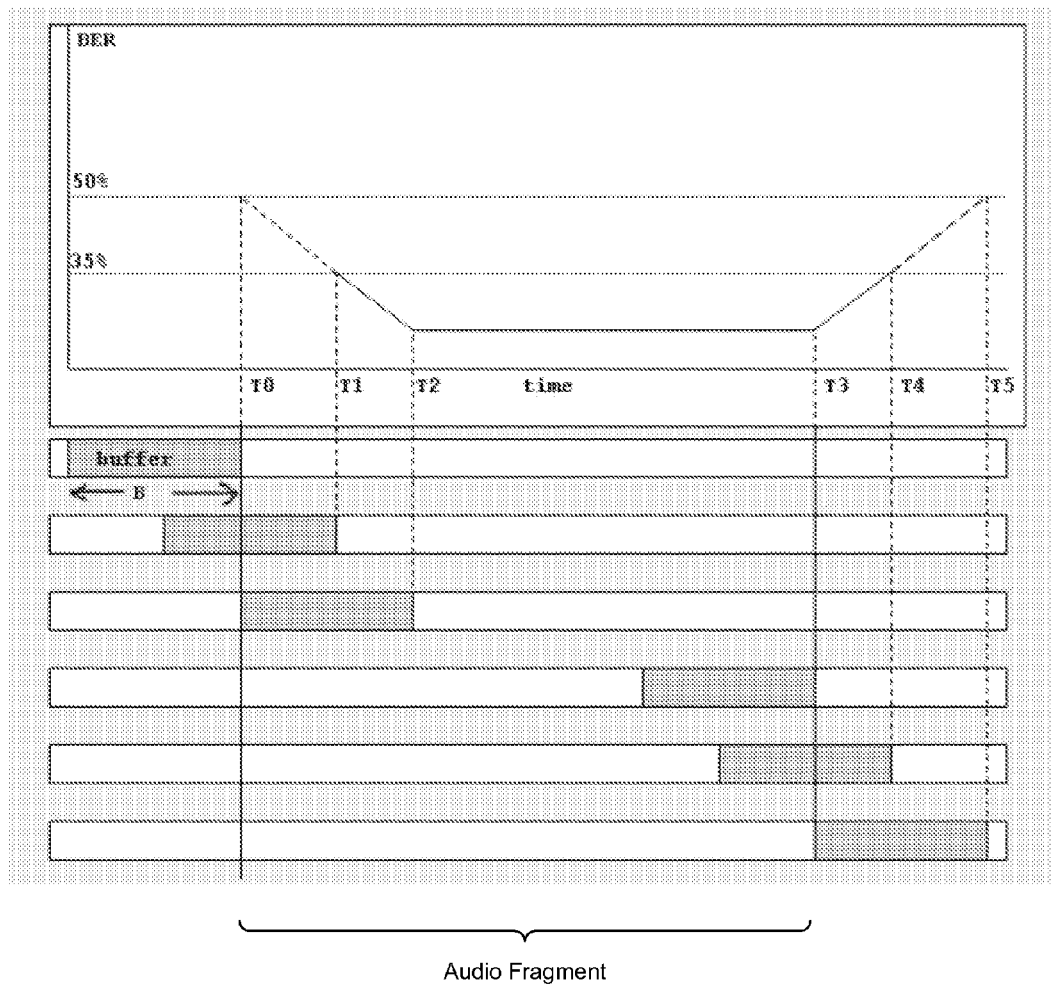
FIG. 4 illustrates an edge detection algorithm, in accordance with an embodiment of the invention.

As explained above, embodiments of the fingerprinting technique accumulate audio samples in sub-band processing buffers. Because of this buffering, the output of the fingerprinting algorithm is delayed and smeared on audio fragment edges. This effect is illustrated in FIG. 4, which is a graph of the bit error rate (BER) over time between reference fingerprints for an audio fragment and a series of fingerprints generated over time for an incoming sample audio stream. In the embodiment illustrated, the sub-band buffers hold three seconds of audio, and a match is declared when two fingerprints have a bit error rate (BER) of 35% or less.

Initially, at time T0, the sub-band processing buffers are empty, and the generated fingerprint thus produces zero matches with the original audio (i.e., the BER is expected to be approximately equal to 50%). As audio samples are added to the sub-band buffers the BER decreases, indicating a better match. After sufficient time passes, the BER decreases below the threshold 35% at time T1, indicating a match. Finally, at time T2, the BER reaches a plateau as the buffers are filled by samples. When the fingerprinting algorithm passes the end of the correspondent audio fragment, at time T3, it begins to produce fingerprints that match less and thus have an increasing BER, which reaches the recognition threshold 35% at time T4. The duration of obtained match curve (T1-T4) and the duration of the plateau (T2-T3) are each shorter than the duration of the matched audio fragment (T0-T3).

In one embodiment, an edge detection algorithm is used to determine the exact edges of a matching audio frame or fragment. A BER curve such as illustrated in FIG. 4 is obtained. The BER curve is segmented into regions, which correspond to the beginning of match with decreasing BER (e.g., T1-T2), the plateau with approximately constant BER (e.g., T2-T3), and the end of match with increasing BER (e.g., T3-T4). Because a real BER curve will generally be noisy, it is segmented using an appropriate technique such as a regression analysis. In one embodiment, all samples that produce BER above 35% are ignored because they may not be reliable. The beginning of the matching audio fragment (i.e., time T1) may then be calculated using linear regression as the crossing of a line that fits in the best way a decreasing BER region (e.g., T1-T2) with a horizontal line that corresponds to 50% BER. A similar approach may be applied to estimate time T5, taking the intersection of a line that fits in the best way an increasing BER region (e.g., T3-T4) and a horizontal line that corresponds to 50% BER. In this case, however, time T5 corresponds to the end of the fragment delayed by the duration B of the sub-band buffer, not the actual end of the matching audio fragment. The location of the end of the fragment (i.e., time T3) can be calculated by subtracting the sub-band buffer duration B from the obtained estimate T5.

In another embodiment, the end of the matching audio fragment is estimated as the end of the region T2-T3, and the beginning of the audio fragment is calculated by subtracting the duration of the sub-band buffer B from time T2, which corresponds to the beginning of the region T2-T3.

Summary

Although discussed in terms of vectors and matrices, the information computed for any fingerprint or sub-fingerprint may be stored and processed in any form, not just as a vector or matrix of values. The terms vector and matrix are thus used only as a convenient mechanism to express the data extracted from an audio sample and is not meant to be limiting in any other way. In addition, although the power spectrum is discussed in terms of a spectrogram, it is understood that the data representing the power spectrum or spectral analysis of an audio signal may be represented and used not only as a spectrogram, but in any other suitable form.

In one embodiment, a software module is implemented with a computer program product comprising a computer-readable medium containing computer program code, which can be executed by a computer processor for performing any or all of the steps, operations, or processes described herein. Accordingly, any of the steps, operations, or processes described herein can be performed or implemented with one or more software modules or hardware modules, alone or in combination with other devices. Moreover, any portions of the system described in terms of hardware elements may be implemented in software, and any portions of the system described in terms of software elements may be implemented in hardware, such as hard-coded into a dedicated circuit. For example, code for performing the methods described can be embedded in a hardware device, for example in an ASIC or other custom circuitry. This allows the benefits of the invention to be combined with the capabilities of many different devices.

In another embodiment, the fingerprinting algorithm is embedded in and run on any of a variety of audio devices, such as a cellular phone, a personal digital assistant (PDA), a MP3 player and/or recorder, a set-top box, or any other device that stores or plays audio content. Embedding the fingerprinting algorithm on such a device may have a number of benefits. For example, generating audio fingerprints directly on a cellular phone would provide better results compared to sending compressed audio from the phone to a fingerprinting server over cell network. Running the algorithm on the cellular phone eliminates distortions caused by GSM compression, which was designed to compress speech and performs poorly on music. Accordingly, this approach may significantly improve the recognition of audio recorded by a cellular phone. It also reduces the load on servers as well as network traffic.

Another benefit of such an embedded approach is the ability to monitor listening experience without violation of privacy and user rights. For example, a recording device may record audio, create fingerprints, and then send only fingerprints to a server for analysis. The recorded audio never leaves the device. The server may then identify targeted music or advertisements using the sent fingerprints, even though it would be impossible to recover the original audio from the fingerprints.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. An article of manufacture comprising an audio fingerprint stored on a non-transitory computer readable storage medium, wherein the audio fingerprint contains characteristic information about an audio frame and is produced by a process comprising:
   filtering, by a computing device, the audio frame into a plurality of frequency bands to produce a corresponding plurality of filtered audio signals;
   resampling, by the computing device, the filtered audio signals at a nonlinear timescale;
   transforming, by the computing device, the resampled audio signals for each frequency band to produce a feature vector for the frequency band; and
   computing, by the computing device, the audio fingerprint based on the set of feature vectors.

2. The article of manufacture of claim 1, wherein filtering the audio frame into a plurality of frequency bands comprises band pass filtering the audio frame in each of the plurality of frequency bands.

3. The article of manufacture of claim 1, wherein filtering the audio frame into a plurality of frequency bands comprises performing a Fast Fourier Transform (FFT) on the audio sample.

4. The article of manufacture of claim 1, wherein the audio frame is part of an audio file stored in an MP3 format, and the filtered audio signals are obtained from an MP3 hybrid filterbank associated with the audio file.

5. The article of manufacture of claim 1, wherein the filtered audio signals are resampled at a logarithmic timescale.

6. The article of manufacture of claim 1, wherein the frequency bands are spaced linearly in a frequency axis.

7. The article of manufacture of claim 1, wherein the frequency bands overlap.

8. The article of manufacture of claim 1, wherein transforming the resampled filtered audio signal of a particular frequency band comprises performing a Fast Fourier Transform (FFT) on the resampled audio signal.

9. The article of manufacture of claim 1, wherein computing the audio fingerprint comprises differentially encoding the feature vectors for the frequency bands.

10. The article of manufacture of claim 1, wherein the process further comprises: computing an index value for the audio fingerprint, the index value comprising a portion of the audio fingerprint.

11. The article of manufacture of claim 10, wherein the index value comprises a portion of the audio fingerprint that corresponds to a set of low frequency components of the transformed audio signals.

12. The article of manufacture of claim 1, wherein the process further comprises:
   disregarding a portion of the audio fingerprint, where the disregarded portion of the audio fingerprint corresponds to a frequency range determined to be insignificant according to an acoustic model.

13. The article of manufacture of claim 12, wherein the acoustic model is a psychoacoustic model.

14. The article of manufacture of claim 12, wherein the acoustic model mimics the properties of an audio encoding process.

15. The article of manufacture of claim 12, wherein the acoustic model mimics the properties of an environment.

16. The article of manufacture of claim 12, wherein the acoustic model mimics the properties of an audio signal.

17. The article of manufacture of claim 1, wherein transforming the resampled filtered audio signal of a particular frequency band comprises performing a Discrete Cosine Transform (DCT) on the resampled audio signal.

18. The article of manufacture of claim 1, wherein the frequency bands have a logarithmic mid-frequency distribution in a frequency axis.

19. The article of manufacture of claim 1, wherein the filtered audio signals are resampled at an exponential timescale.

20. The article of manufacture of claim 1, wherein computing the audio fingerprint comprises encoding the feature vectors for the frequency bands by assigning bit values according to a codebook table.

21. The article of manufacture of claim 20, wherein the process further comprises: training the codebook table to determine a set of codebook values; and tuning the codebook table based on the determined set of codebook values.

22. A database of audio fingerprints, the database comprising a non-transitory computer readable storage medium that contains a plurality of audio fingerprints, wherein each audio fingerprint contains characteristic information about a corresponding audio frame and is produced by a process comprising:
   filtering, by a computing device, the corresponding audio frame into a plurality of frequency bands to produce a corresponding plurality of filtered audio signals,
   resampling, by the computing device, the filtered audio signals at a nonlinear timescale,
   transforming, by the computing device, the resampled audio signals for each frequency band to produce a feature vector for the frequency band, and
   computing, by the computing device, the audio fingerprint based on the set of feature vectors; and one or more index values for one or more of the audio fingerprints,
   wherein the audio fingerprints are organized in the database according to their index values.

23. The database of claim 22, wherein each index value comprises a portion of an audio fingerprint associated with the index value.

24. An article of manufacture comprising an audio fingerprint stored on a non-transitory computer readable storage medium, wherein the audio fingerprint contains characteristic information about an audio frame and is produced by a process comprising:

computing, by a computing device, a spectrogram for the audio frame;

sampling, by the computing device, the spectrogram at a nonlinear time scale for a plurality of frequency bands in the spectrogram;

extracting, by the computing device, a long-term feature vector using the samples from each of the sampled frequency bands; and generating, by the computing device, the audio fingerprint based on the feature vectors.

25. The article of manufacture of claim 24, wherein the spectrogram is sampled at a logarithmic timescale.

26. A method for extracting an audio fingerprint from an audio frame, the method comprising:

filtering, by a computing device, the audio frame into a plurality of frequency bands to produce a corresponding plurality of filtered audio signals;

transforming, by the computing device, the plurality of filtered audio signals for each frequency band using a discrete cosine transform (DCT) to produce a feature vector for the frequency band;

computing, by the computing device, the audio fingerprint based on the set of feature vectors; and storing, by the computing device, the computed audio fingerprint on a non-transitory computer readable medium.

27. The method of claim 26, further comprising:
resampling the filtered audio signals at a nonlinear timescale.

28. The method of claim 27, wherein the filtered audio signals are resampled at a logarithmic timescale.

29. The method of claim 26, wherein the frequency bands are spaced linearly in a frequency axis.

30. The method of claim 26, wherein the frequency bands overlap.

31. The method of claim 26, wherein computing the audio fingerprint comprises differentially encoding the feature vectors for the frequency bands.

32. The method of claim 26, further comprising:
    computing an index value for the audio fingerprint, the index value comprising a portion of the audio fingerprint.

33. The method of claim 32, wherein the index value comprises a portion of the audio fingerprint that corresponds to a set of low frequency components of the transformed audio signals.

34. The method of claim 26, further comprising:
    disregarding a portion of the audio fingerprint, where the disregarded portion of the audio fingerprint corresponds to a frequency range determined to be insignificant according to an acoustic model.

35. The method of claim 34, wherein the acoustic model is a psychoacoustic model.

36. The method of claim 34, wherein the acoustic model mimics the properties of an audio encoded process.

37. The method of claim 34, wherein the acoustic model mimics the properties of an environment.

38. The method of claim 34, wherein the acoustic model mimics the properties of an audio signal.

* * * * *